United States Patent [19]

Nishikawa

[11] Patent Number: 4,597,309
[45] Date of Patent: Jul. 1, 1986

[54] DEVICE FOR REGULATING THE DIRECTION OF ROTATION OF SLOT MACHINE HANDLE

[75] Inventor: Ikuo Nishikawa, Tochigi, Japan

[73] Assignee: Kabushiki Kaisha Universal, Tochigi, Japan

[21] Appl. No.: 518,937

[22] Filed: Aug. 1, 1983

[30] Foreign Application Priority Data

Aug. 2, 1982 [JP] Japan ............................ 57-116222[U]

[51] Int. Cl.⁴ .................................................. G05G 1/00
[52] U.S. Cl. .................... 74/575; 74/577 R; 74/528; 273/143 R
[58] Field of Search ................... 74/575, 577 R, 577 S, 74/528, 530; 273/143 R

[56] References Cited

U.S. PATENT DOCUMENTS

| | | | |
|---|---|---|---|
| 2,041,065 | 5/1936 | Hemphill | 74/530 V X |
| 2,630,297 | 3/1953 | Hunz | 74/577 S |
| 4,185,519 | 1/1980 | Hays et al. | 74/577 S |
| 4,249,737 | 2/1981 | Hancherick | 273/143 R |

FOREIGN PATENT DOCUMENTS 920398 2/1973 Canada ............................ 74/577 S Primary Examiner—Kenneth J. Dorner
Assistant Examiner—Rodney M. Lindsey
Attorney, Agent, or Firm—Young & Thompson

[57] ABSTRACT

A device for regulating the direction of rotation of a slot machine handle is disclosed, which ensures reliable forward and return motions of the handle. A rack member is moved through a guide member in an interlocked relation to the handle. A rachet pawl is rotatably mounted in the guide member. The rack member has a series of teeth thereon, with a recess at each end of the series. Only when the pawl is in one of those recesses, can the direction of movement of the rack be reversed. As a result, only when the handle has been fully pulled, or fully returned, can its direction of rotation be reversed.

7 Claims, 6 Drawing Figures

DEVICE FOR REGULATING THE DIRECTION OF ROTATION OF SLOT MACHINE HANDLE

BACKGROUND OF THE INVENTION

This invention relates to a prize-winning game slot machine and, more particularly, a device for regulating the direction of rotation of the slot machine handle, which prevents the motion of the handle in the reverse direction until the handle completes a full motion in one direction.

A conventional prize-winning game slot machine, as shown in FIG. 1, is adapted such that it is rendered ready for operation for a game when a coin or coins (inclusive of tokens) are inserted into a coin slot 1. A handle 2 is then pulled in the direction of arrow X, whereby reels 3 are caused to start rotation at a high speed either mechanically or electrically. When stop buttons 4 for the respective reels 3 are depressed after a suitable period of time, the reels are all brought to a stop by the action of a random timer unit. The points for the game are determined by the combination of symbol patterns of the reels that are displayed when the reels are stopped. Coins or tokens are paid out in number corresponding to the game points into a saucer 5.

In such a slot machine, the rotation of the reels which are driven either mechanically or electrically, is started when the handle is pulled to a predetermined extent. The slot machine also has a locking mechanism for locking the handle 2. When it is detected that a specified number of coins or tokens are inserted into the coin slot 1, the locking mechanism releases the lock of the handle 2, while it locks the handle 2 when the handle 2 is returned to the initial position after the start of rotation of the reels 3.

The locking mechanism having the functions noted above requires means for regulating the direction of rotation of the handle. More specifically, unless such means are provided, the return of the handle 2 to the initial position before the handle 2 is pulled to the reel start position to start rotation of the reels 3, would cause the locking mechanism to lock the handle 2 again. When this results, the reels can no longer be started despite the fact that the necessary coins have been inserted. Another deficiency arises if no means for regulating the direction of rotation is provided. Without the regulating means, the direction of rotation of the handle 2 may be reversed from the direction of arrow X from an intermediate position before the handle 2 is returned to the initial position at which it is locked. Therefore, if the handle 2 is intentionally held at an intermediate position instead of returning it to the initial position after the start of the reels and pulled again from that position to the reel start position after the game is over, a new game may be played without newly inserting any coin. The means for regulating the direction of rotation of the handle 2, according to the present invention, is provided for avoiding the erroneous locking of the handle and unfair operation of the handle described above. It functions such that it prevents the rotation of the handle toward the initial position while the handle is being pulled toward the reel start position after the insertion of the coin or coins. Also, it allows the rotation of the handle only in the direction toward the initial position after the reel start position has been reached.

In a conventional device for regulating the direction of rotation of the handle, a sector-like ratchet member is secured to a shaft extending between a pair of frame members and is rotatable in an interlocked relation to the operation of the handle, and a ratchet pawl coupled to the frame. The ratchet pawl is pivoted to a stationary part integral with the body of the slot machine and biased therefrom by a spring. Since the ratchet member is mounted on the shaft interlocked to the handle, the ratchet pawl is inevitably disposed in an inner space at a considerable distance from the outer wall of the slot machine body. Therefore, the inspection or replacement of the ratchet pawl cannot be performed merely by removing an outer cover of the slot machine but requires disassembly of various components using various tools, which is very cumbersome.

SUMMARY OF THE INVENTION

The primary object of the invention is to provide a device for regulating the direction of rotation of a handle, which can be readily assembled and disassembled.

Another object of the invention is to provide a device for regulating the direction of rotation of a handle, which permits ready inspection and replacement of components.

A further object of the invention is to provide a unified device for regulating the direction of rotation of a handle.

The above and further objects, features and advantages of the invention are attained by a device for regulating the direction of rotation of a handle, which comprises a rack member coupled to the handle and movable in longitudinal directions, a guide member supporting the rack member so as to guide the movement thereof, and a ratchet pawl rotatably mounted in the guide member.

DETAILED DESCRIPTION OF THE INVENTION

Figure 1:
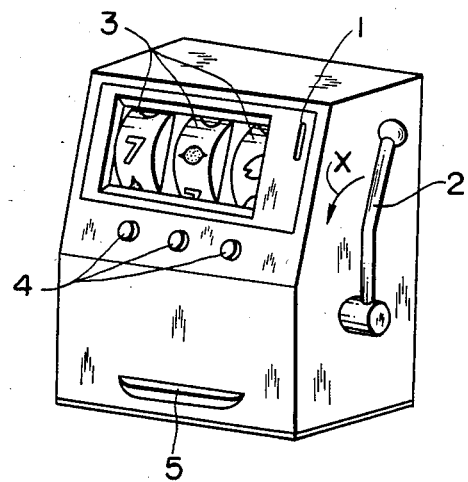
FIG. 1 is a perspective view showing a prize-winning game slot machine.
Figure 2:
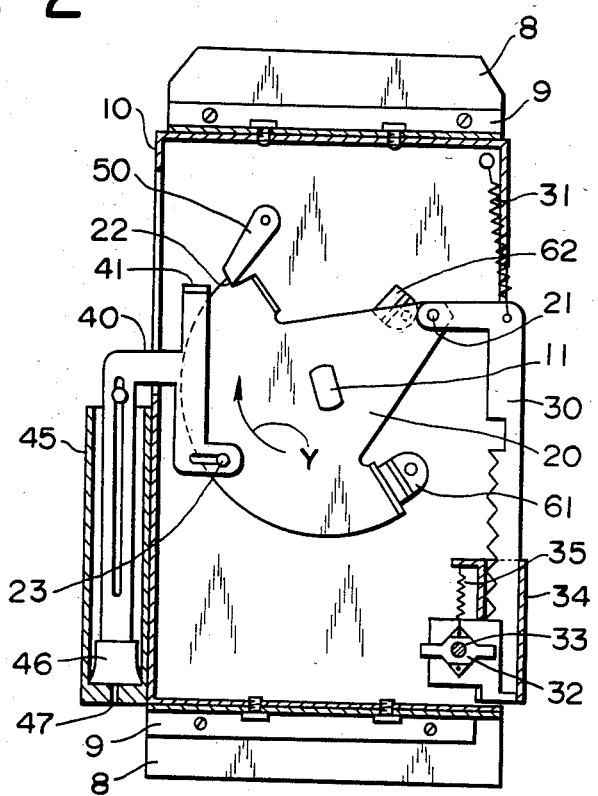
FIG. 2 is a front view showing a mechanism related to a handle employing an embodiment of the invention, with a frame being shown broken away.

FIG. 2 shows a mechanism related to the handle. A frame 10 is secured to a base plate 8 via a mounting plate 9. A shaft 11 which is rotated in unison with the handle 2 shown in FIG. 1 is mounted in the base plate 8 via a bearing (not shown). A driving member 20 is secured to the shaft 11 for rotation in unison with the handle 2. In the operation of the handle to start the reels the driving member 20 is rotated in the direction of arrow Y. The driving member 20 has two pins 21 and 23 projecting substantially symmetrically with respect to the shaft 11. A rack member 30 is pivoted to the pin 21. It has a vertically extending straight portion having a plurality of teeth with a tip angle of 90 degrees. Upon the rotation of the driving member 20 in the direction of arrow Y the rack member 30 is moved downwards. The rack member 30 is upwardly biased by a spring 31 having one end attached to the upper end of its vertically extending portion. A ratchet pawl 32 can engage with the teeth of the rack member 30. It is pivotally mounted on a pin 33 penetrating the base plate 8. The pin 33 also penetrates a guide member 34. The guide member 34 restricts the pivotal motion of the rack member 30 extending through it about the pin 21, thereby ensuring the engagement of the ratchet pawl 32 with the teeth of the rack member 30. The ratchet pawl 32 is biased to its neutral position by a spring 35 having one end attached to the ratchet pawl 32 and the other end attached to the guide member 34. As is obvious from the Figures, the guide member 34 is mounted on the base plate 8 only by the pin 33, and is thus pivotable about the pin 33.

The other pin 23 of the driving member 20 is received in a slot formed in a cushion lever 40. With the rotation of the driving plate 8 in the direction of arrow Y, the cushion lever 40 is moved upwards. The cushion lever 40 has a piston 46 secured to its lower end, the piston 46 being movable through an air cylinder 45. When the cushion lever 40 is moved upwards, air is drawn into the cylinder 45 through a small hole 47 formed in the bottom of the cylinder, upon with a downward movement of the cushion lever 40 air is discharged through the small hole 47. The withdrawal and discharge of air have an adequate braking effect on the rotation of the driving member 20.

A locking pawl 50 is pivotally mounted on the base plate 8. It can be engaged with and disengaged from a locking shoulder 22 formed on the sector-like portion of the driving member 20. Thus it functions to allow or block the operation of the driving member 20 in unison with the handle 2 to start the reels. The specific construction of the locking pawl 50 is irrelevant to the invention so that it is not described. When it is detected that a coin or coins are inserted into the slot machine in the stationary state shown in FIG. 2, the locking pawl 50 is actuated so that it is desengaged from the driving member 20 and is locked in an out-of-engagement position. Upon disengagement of pawl 50 from the driving member 20, the driving member 20 can be rotated. Toward the end of a predetermined rotation of the member 20, the locking pawl 50 is released from its lock in the out-of-engagement position to be ready for engagement with the locking shoulder 22 again. (At this instant, the reels have already been started.) When the driving member 20 is returned in unison with the handle 2 to the initial position, it is locked again by the locking pawl 50. The cushion lever 40 has a projection 41 provided at its upper end. The projection 41 reaches its uppermost position when the driving member 20 reaches the end position of the predetermined forward rotation. This movement of the projection 41 may be utilized to release the locking pawl 50 in the out-of-engagement position noted above. Stoppers 61 and 62 are secured to the base plate 8 to restrict the rotation of the driving member 20.

In operation, when a coin or coins are inserted into the slot machine, the locking pawl 50 is actuated and disengaged from the driving member 20. Then, by pulling the handle 2 the driving member 20 is rotated in the direction of arrow Y. Toward the end of the predetermined rotational stroke of the handle 2, the reels are started. By subsequently removing or reducing the operating force applied to the handle 20, it is returned in unison with the driving member 20 to the initial position shown in FIG. 2, whereupon the driving member 20 is locked again by the locking pawl 50.

Figure 3:
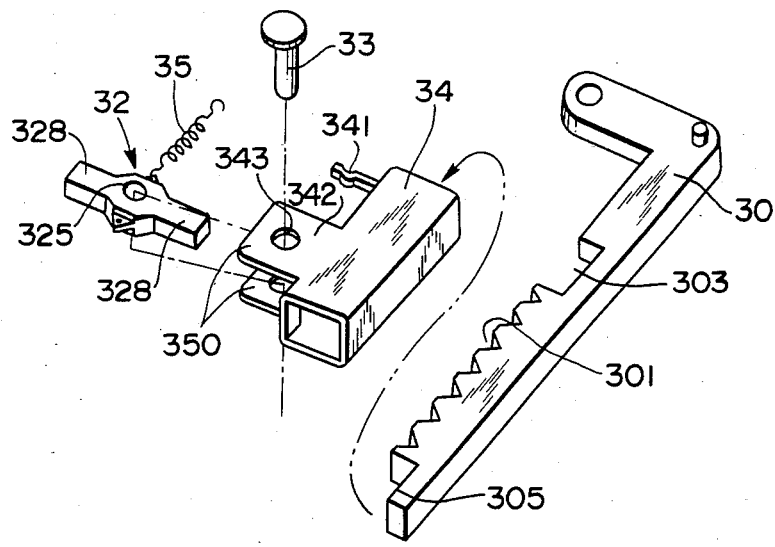
FIG. 3 is an exploded perspective view showing an embodiment of the device according to the invention.

As is shown most clearly in FIG. 3, the rack member 30 has notches 303 and 305 formed adjacent to the opposite ends of the row of teeth 301. The guide member 34 has opposite side projections 342 and also has a spring retainer portion 341. The side projections 342 serve as a ratchet pawl support 350 and have aligned holes 343. The pin 33 is inserted through the holes 343. The ratchet pawl 32 has a hole 325, through which the pin 33 is inserted. It also has opposite side rectangular pawl portions 328. Although the illustrated ratchet pawl 32 has the opposite side pawl portions 328, principally only a single pawl portion is needed. In assembly, the ratchet pawl 32 is inserted into the ratchet pawl support 350, the pin 33 is inserted through the two components, one end of the spring 35 is attached to the spring retainer portion 341, and then The rack member 30 is inserted into the guide member 34 from above. In assembling the components noted into the slot machine body, the pin 33 is inserted through, for instance, a mounting hole formed in the base plate 8 shown in FIG. 2.

Figures 4A, 4B:
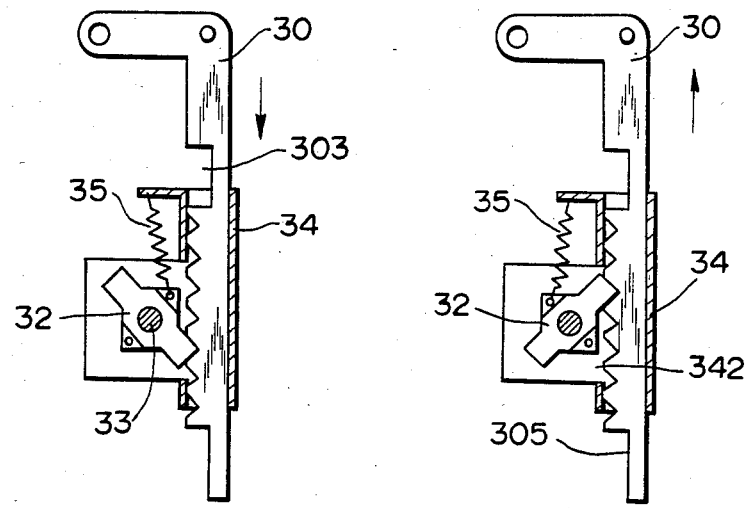
FIGS. 4A and 4B are views for explaining the operation of the device according to the invention.

FIGS. 4A and 4B illustrate the function of the assembly described above. FIG. 4A shows the rack member 30 being lowered, while FIG. 4B shows it being raised. It will be seen from FIG. 4A that when the rack member 30 is lowered, the ratchet pawl 32 is turned approximately 45 degrees in the clockwise direction about the pin 33 from its neutral position shown in FIG. 2. Once this position of the ratchet pawl 32 results, it allows only the downward movement of the rack member 30 and blocks the upwards movement thereof. When the notch 303 of the rack member 30 being moved downwards reaches the ratchet pawl 32, the ratchet pawl 32 is returned to the neutral position by the spring 35. When the rack member 30 is subsequently raised, the ratchet pawl 32 is now turned approximately 45 degrees in the counter-clockwise direction, as shown in FIG. 4B. In this position, the ratchet pawl 32 allows only the upward movement of the rack member 30. When the notch 305 of the rack member 30 reaches the ratchet pawl 32, the ratchet pawl 32 is returned again to the initial neutral position.

Figure 5:
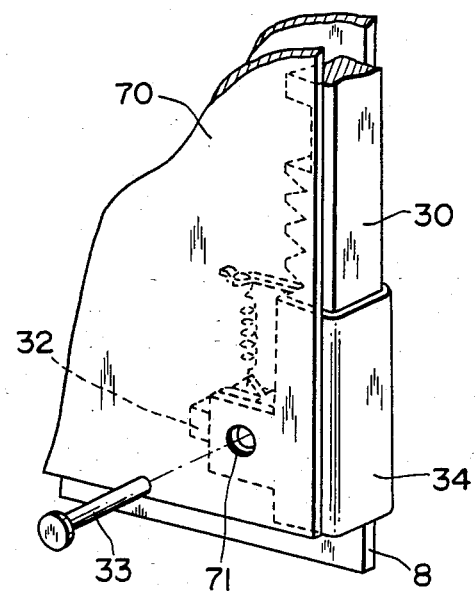
FIG. 5 is a perspective view showing the manner in which the device according to the invention is mounted in a frame.

The rotational direction regualting device having the function described above according to the invention is assembled in a manner as shown in FIG. 5. More specifically, the pin 33 is first inserted through an opening 71 of the base plate 8 or an outer cover 70 secured thereto, the hole 343 of one of the opposite side projections 342 of the guide member 34, the hole 325 of the ratchet pawl 32 and the hole 343 of the other side projection 342 of the guide member 34. It is to be understood that the ratchet pawl 32 and guide member 34 are mounted on the slot machine body by the pin 33 only. This mounting system permits ready removal of the ratchet pawl 32 and guide member 34 by pulling out the pin 33. When the guide member 34 is removed, the rack member 30 which is pivotally coupled to the driving member 20 as shown in FIG. 2 can be turned about the pin 21 of the driving member 22 so that it can be pulled out to the right in FIG. 5. For the inspection of the device, the operation of examining the ratchet pawl 32 and the teeth of the rack member 30 thus can be facilitated. Also, the replacement of the ratchet pawl 32 can be readily performed. The ratchet pawl 32 in the above embodiment, having the opposite side pawl portions 328 provided on the opposite sides of the pin 33, is very convenient for one of these pawl portions can be used when the other is worn out by turning the ratchet pawl 180 degrees or reversing it.

What is claimed is:

1. A device for regulating the direction of rotation of a handle comprising:
   a straight rack member having two notches and a plurality of teeth formed between said notches and movable in the longitudinal direction thereof, means pivotally interconnecting said rack member to said handle about an axis eccentric to the axis of rotation of said handle;
   a guide member for supporting said rack member such that said rack member can be moved therethrough, said guide member being pivotally mounted on a common support with said handle about an axis eccentric to both the axis of rotation of the handle and the said axis of pivotal interconnection to permit tilting of said rack member; and
   a ratchet pawl rotatably mounted in said guide member, said pawl being engageable with one side of each of said teeth to permit movement of said rack member in only one direction and being swingable over center and engageable with the opposite side of each of said teeth to permit movement of the rack member only in the opposite direction, the spaces between said teeth being too small to permit said over center movement but said notches being sufficiently large to permit said over center movement, whereby the rack member can reverse its direction of movement only when the ratchet pawl is in one of said notches.

2. The device according to claim 1, wherein said ratchet pawl is biased to a neutral position by a toggle spring.

3. The device according to claim 2, wherein said rack member is coupled to a rotary member rotatable in unison with said handle.

4. The device according to claim 3, wherein adjacent teeth of said rack member define a 90-degree notch.

5. The device according to claim 4, wherein said ratchet pawl has a rectangular shape.

6. The device according to claim 4, wherein said ratchet pawl has a substantially central portion rotatably fitted on a pin.

7. The device according to claim 5, wherein said ratchet pawl and guide member are mounted between a pair of frame members by a single pin.

* * * * *